United States Patent
Poojar et al.

(10) Patent No.: US 11,383,665 B2
(45) Date of Patent: Jul. 12, 2022

(54) DRIVER AIRBAG MODULE COUPLING ASSEMBLIES

(71) Applicant: Autoliv ASP, Inc., Ogden, UT (US)

(72) Inventors: Uma Poojar, Hubli (IN); Shivanand Hallur, Muddebihal (IN); Terry Allen Sella, Clarkston, MI (US); Srirama C. Gollu, Auburn Hills, MI (US)

(73) Assignee: Autoliv ASP, Inc., Ogden, UT (US)

(*) Notice: Subject to any disclaimer, the term of this patent is extended or adjusted under 35 U.S.C. 154(b) by 261 days.

(21) Appl. No.: 16/709,104

(22) Filed: Dec. 10, 2019

(65) Prior Publication Data

US 2021/0170979 A1   Jun. 10, 2021

(51) Int. Cl.
*B60R 21/203*   (2006.01)

(52) U.S. Cl.
CPC ............................ *B60R 21/2035* (2013.01)

(58) Field of Classification Search
CPC ..................... B60R 21/2035; B60R 21/2037
See application file for complete search history.

(56) References Cited

U.S. PATENT DOCUMENTS

| | | | | |
|---|---|---|---|---|
| 7,059,631 | B2 | 6/2006 | Schorle et al. | |
| 7,533,897 | B1* | 5/2009 | Xu | B60Q 5/003 280/728.2 |
| 2001/0054810 | A1* | 12/2001 | Sakane | B60R 21/2037 280/728.2 |
| 2004/0169358 | A1* | 9/2004 | Fujita | B60R 21/2037 280/731 |
| 2006/0208470 | A1 | 9/2006 | Tsujimoto et al. | |
| 2012/0080868 | A1* | 4/2012 | Banno | B60R 21/2037 280/728.2 |
| 2017/0361801 | A1* | 12/2017 | Banno | B60R 21/2037 |
| 2019/0047604 | A1* | 2/2019 | Banno | B62D 1/046 |
| 2020/0189657 | A1* | 6/2020 | Gothekar | B60Q 5/003 |
| 2020/0398782 | A1* | 12/2020 | Mills | B60R 21/215 |

FOREIGN PATENT DOCUMENTS

| | | | | |
|---|---|---|---|---|
| DE | 102014001821 A1 * | 8/2015 | ......... | B60R 21/2037 |
| DE | 102017119886 A1 * | 2/2019 | ......... | B60R 21/2037 |
| DE | 102018102755 A1 * | 8/2019 | ....... | B60R 21/21658 |
| EP | 1179457 | 2/2002 | | |

(Continued)

OTHER PUBLICATIONS

EP1179457A, Machine Translation (18 pgs).
EP1705075B1, Machine Translation (20 pgs).

*Primary Examiner* — Nicole T Verley
(74) *Attorney, Agent, or Firm* — Matthew D. Thayne; Thayne and Davis LLC

(57) ABSTRACT

Airbag module coupling interfaces, assemblies, and related methods. Some embodiments may comprise one or more springs each defining a perimeter comprising at least three sides, wherein a first side of which may extend opposite a second side and may be at least partially angled towards the second side at an acute angle. A third side of the spring may connect the first and second sides. A spring mounting structure may be provided and may comprise a guiding interface for coupling the spring to the steering wheel. An opening in the guiding interface may be configured to receive a coupling prong, which may be configured to engage the third side of the spring.

7 Claims, 5 Drawing Sheets

(56) References Cited

FOREIGN PATENT DOCUMENTS

| EP | 1705075 | | 12/2008 | | |
|----|---------|----|--------|---|---|
| EP | 2085290 | A1 * | 8/2009 | ......... | B60R 21/2037 |
| EP | 2910425 | A1 * | 8/2015 | ......... | B60R 21/2037 |
| EP | 3178707 | A1 * | 6/2017 | ............ | B60Q 5/003 |
| WO | WO-2009109265 | A1 * | 9/2009 | ............ | B60Q 5/003 |
| WO | WO-2011108360 | A1 * | 9/2011 | ......... | B60R 21/2037 |
| WO | WO-2013118590 | A1 * | 8/2013 | ......... | B60R 21/2037 |
| WO | WO-2017214214 | A2 * | 12/2017 | ........... | B60R 21/201 |

* cited by examiner

DRIVER AIRBAG MODULE COUPLING ASSEMBLIES

SUMMARY

Airbag cushions are often assembled within steering wheels. However, in newer vehicles, steering wheels tend to incorporate more features and associated airbag modules are often more compact. Thus, it is important for airbag module interfaces to provide a small footprint and/or to otherwise impact the space and/or design of other features as minimally as possible. In addition, the ability to quickly and easily couple, and in some cases decouple, an airbag module to a steering wheel may be important.

In some embodiments, the inventive concepts disclosed herein may therefore provide a coupling interface/assembly having a relatively small footprint and/or one that is simple, easy to use, and/or provides the ability to uncouple the assembly for servicing and/or replacement of the airbag module as needed. Although most preferred embodiments of the invention are therefore in the context of driver/steering wheel airbag module coupling assemblies, it should be understood that the principles disclosed herein may be useful in the context of other airbag modules, such as passenger airbag modules, knee airbag modules, curtain airbag modules, and the like.

In a more particular example a coupling assembly for coupling a driver airbag module to a steering wheel, the coupling assembly may comprise a spring, such as a spring clip, which may define a perimeter, in some embodiments within a single plane, that may comprise at least three sides and/or legs. A first side/leg of the at least three sides/legs may extend opposite from a second side/leg of the at least three sides/legs. The first side/leg may be at least partially angled towards the second side/leg of the spring at an acute angle, such as an angle of between about 20 and about 40 degrees. The first and second sides/legs of the spring may be connected along a third side/leg of the at least three sides/legs of the spring. The assembly may further comprise a spring mounting structure, which may be configured to provide a guiding interface for coupling the spring to the steering wheel. An opening may be provided that may be configured to receive a coupling prong, such as a coupling prong extending from the airbag module. The coupling prong may be configured to engage the third side/leg of the spring during installation.

In some embodiments, the spring mounting structure may comprise a linear interface surface configured to engage the first side/leg of the spring to inhibit rotation of the first side/leg of the spring as the second side/leg of the spring rotates during assembly. In some such embodiments, once the spring has been seated within the spring mounting structure, the spring may be configured to inhibit further rotation but allow a translation of the spring. Such translation may be provided by simply inserting a prong or other protruding member through the opening to engage the spring.

In some embodiments, the third side/leg may extend from the first and second sides/legs of the spring at an at least substantially perpendicular angle. In some embodiments, the third side/leg may extend from the first and/or second sides/legs of the spring at an angle between about 70 and about 90 degrees. Of course, this angle need not be perpendicular, nor at least substantially perpendicular, in other embodiments.

In some embodiments, the first and/or second sides/legs of the spring may each comprise a straight portion extending from the third side/leg at the at least substantially perpendicular angle and an angled portion extending from the straight portion. The angled portions of the first and second sides/legs may be angled towards one another.

In some embodiments, the spring may further comprise a fourth side/leg opposite the third side/leg, which may extend at least substantially parallel to the third side/leg so as to at least substantially define a trapezoid in shape. In some embodiments, the first side/leg may be symmetrical with the second side/leg about an axis of the spring extending between the third side/leg and the fourth side/leg.

In some embodiments, the airbag module and/or the steering wheel may comprise a plurality of springs and a plurality of corresponding spring mounting structures.

In an example of an airbag assembly according to some embodiments, the assembly may comprise an airbag module and one or more mounting interfaces for coupling the airbag module to a vehicle structure. The mounting interface may comprise opposing mounting structures and/or surfaces. The assembly may further comprise one or more springs configured to engage the mounting interface(s). Each spring may define a perimeter comprising at least three sides and/or legs. The assembly may further comprise one or more coupling prongs each configured to engage a spring to secure the airbag module to the mounting interface. The coupling prong(s) may be configured to engage one or more of the at least three sides and/or legs and translate the spring(s) during securement of the airbag module to the mounting interface in a first direction.

In some embodiments, the airbag module may comprise a driver airbag module and the vehicle structure may comprise a vehicle steering wheel. The opposing mounting surfaces may be defined by opposing mounting structures of the mounting interface.

In some embodiments, the coupling prong(s) may be attached to and/or extend from the airbag module. The coupling prong(s) may comprise a ramped tip and/or otherwise be configured to translate the spring during securement of the airbag module to the mounting interface. In some embodiments, the coupling prong(s) may further comprise a hooked and/or recessed portion adjacent to the ramped tip. The hooked/recessed portion may be configured to receive a portion of the spring after the ramped tip has extended past the spring to allow the spring to translate in a second direction distinct from the first direction. In some such embodiments, the second direction may be opposite, or at least substantially opposite, from the first direction.

In other embodiments, the coupling prong(s) may be attached to and/or extend from a portion of the vehicle, such as the steering wheel.

In some embodiments, the mounting interface(s) may comprise an opening configured to receive a coupling prong. In some such embodiments, the opening may be positioned such that the coupling prong extends into a central region of the spring defined by the perimeter of the spring, and the opening may at least partially overlap with a position of the spring when the spring is coupled with the mounting interface to allow the coupling prong to contact and move the spring during assembly.

In an example of a method for coupling a driver airbag module with a steering wheel according to some implementations, the method may comprise coupling a spring to a mounting interface. The spring may define a perimeter, which, in some embodiments, may comprise at least three sides. The step of coupling the spring to the mounting interface may comprise engaging a first side of the spring with a first surface of the mounting interface while rotating a second side of the spring opposite the first side. The method may further comprise inserting a coupling prong through an opening formed in the mounting interface, which may translate the spring in a first direction and then in a second direction, which may be opposite, or at least substantially opposite, the first direction.

In some implementations, the coupling prong may comprise a ramped tip. IN some such implementations, the step of inserting the coupling prong through the opening formed in the mounting interface may comprise engaging a third side of the spring extending between the first and second sides of the spring with a surface of the ramped tip.

In some implementations, the coupling prong may further comprise a hooked portion adjacent to the ramped tip, and the step of inserting the coupling prong through the opening formed in the mounting interface may further comprise allowing the spring to extend into the hooked portion after the ramped tip has extended past the spring to allow the spring to translate in the second direction.

In some implementations, the first surface may comprise a flat surface, and the step of coupling the spring to the mounting interface may comprise engaging the first side of the spring with the flat surface of the mounting interface to prevent rotation of the first side of the spring while the second side of the spring pivots about a second surface of the mounting interface.

Some implementations may further comprise releasing the driver airbag module from the steering wheel, which may take place, for example, by translating the spring away from the coupling prong and withdrawing the coupling prong from the opening.

The spring may, in some embodiments and implementations, comprise a third side and/or leg extending between the first and second sides/legs. The third side/leg may engage the coupling prong during the step of inserting the coupling prong through the opening formed in the mounting interface. In some embodiments and implementations, the spring may further comprise a fourth side/leg opposite the third side/leg. In some such implementations, the step of releasing the driver airbag module from the steering wheel may comprise engaging the fourth side to translate the spring away from the coupling prong.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1A:
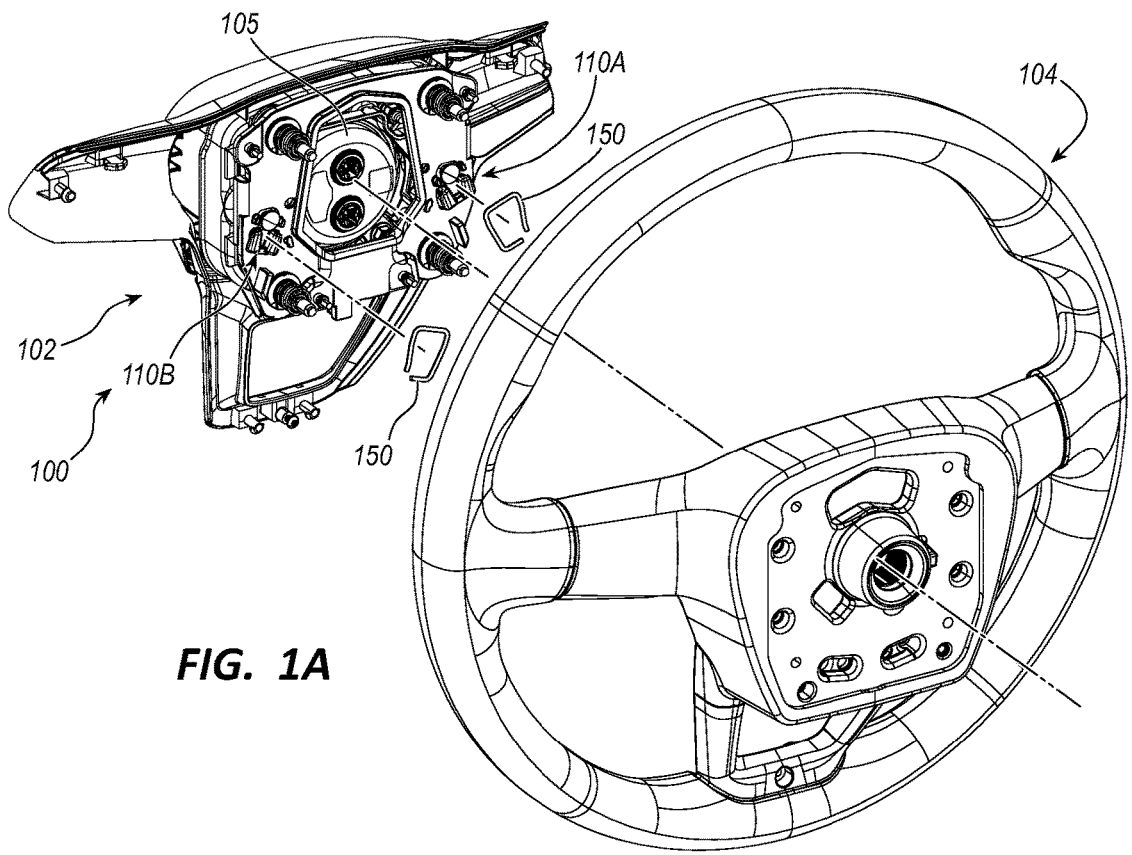
FIG. 1A is an exploded view of an airbag module and a mounting interface for coupling the airbag module to a steering wheel according to some embodiments.
Figure 1B:
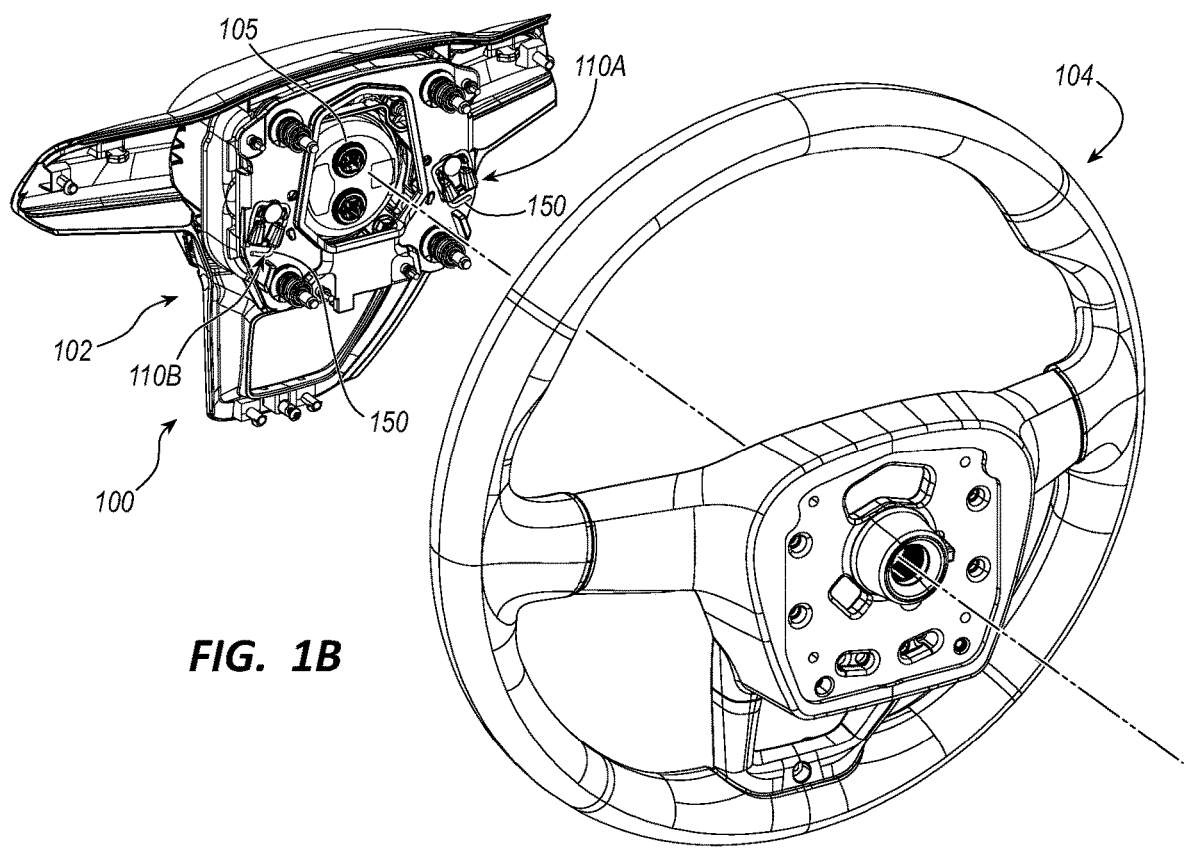
FIG. 1B depicted the airbag module and mounting interface of FIG. 1A with mounting spring clips coupled to the mounting interface.

FIGS. 1A and 1B depict an assembly 100 comprising an airbag module 102 configured to be coupled to a steering wheel 104 according to some embodiments. A coupling assembly may be provided to facilitate mounting or otherwise coupling of airbag module 102, which comprises an inflator 105, to steering wheel 104, which may comprise one or more mounting interfaces, such as mounting interfaces 110A and 110B shown in these figures. It should be understood that these mounting interfaces would typically comprise certain elements from both airbag module 102 and other elements on steering wheel 104. However, as those of ordinary skill in the art will appreciate, the depicted elements may be positioned at alternative locations as desired. For example, although most of the elements are shown in the exploded views of FIGS. 1A and 1B as being part of airbag module 102, one or more of the elements shown on airbag module 102 may instead be positioned on steering wheel 104, and vice versa. In some embodiments, for example, one or more of the mounting elements depicted and discussed in greater detail below may be overmolded to, for example, a horn plate or another portion of steering wheel 104.

Figure 2:
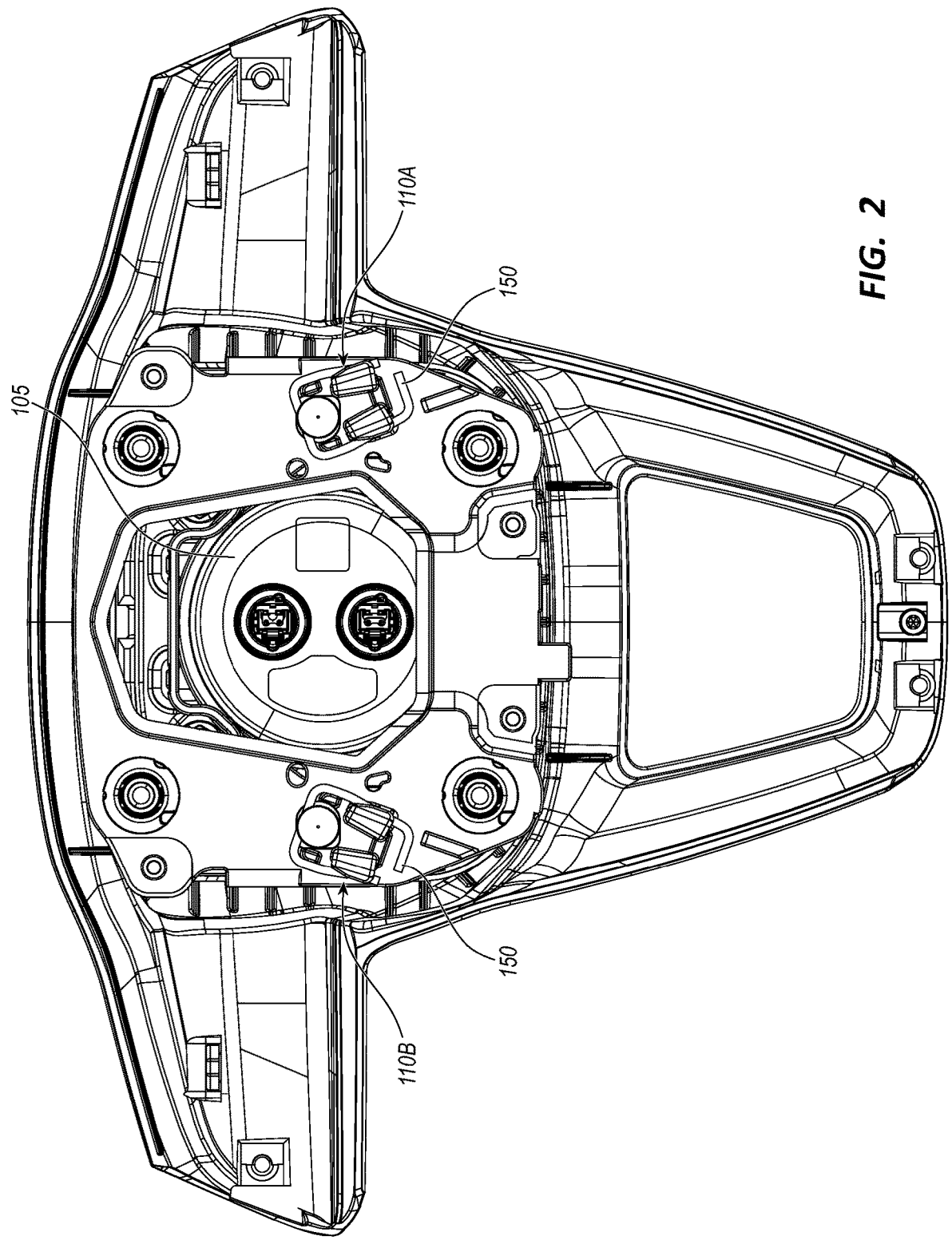
FIG. 2 is a plan view of the airbag module and mounting interface of FIGS. 1A and 1B.

The embodiment depicted in FIGS. 1-2 further comprises a plurality of spring clips 150 each configured to couple to one mounting interface 110 to lock airbag module 102 to steering wheel 104. It should also be understood, however, that any number of such mounting interfaces 110 may be used. For example, in some embodiments, a single, preferably centralized mounting interface 110 may be sufficient to secure airbag module 102 in place. In other embodiments, four such mounting interfaces 110 may be used, or any other number as desired. FIG. 1A depicts spring clips 150 detached from their respective mounting interfaces 110 and FIG. 1B depicts them secured in place. It should be understood, however, that typically the pins, prongs or other coupling members to which spring clips 150 are coupled would either extend from airbag module 102 or steering wheel 104 and therefore the prongs depicted in FIG. 1-2 are shown detached in these figures and/or the interface itself is shown detached in these figures for ease of illustration, as should be apparent from the more detailed discussion below.

Figure 3A:
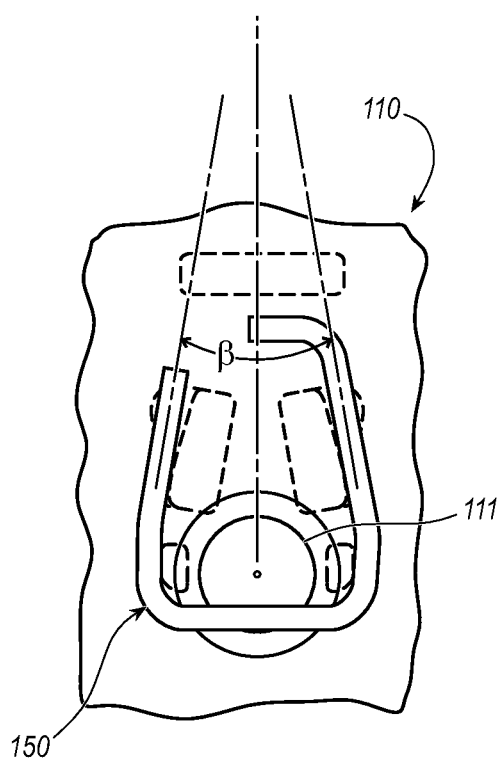
FIG. 3A is a close-up view of a mounting interface and spring clip with various elements of the mounting interface shown in phantom to allow for viewing of contact interfaces between the spring clip and mounting structures of the mounting interface.
Figure 3B:
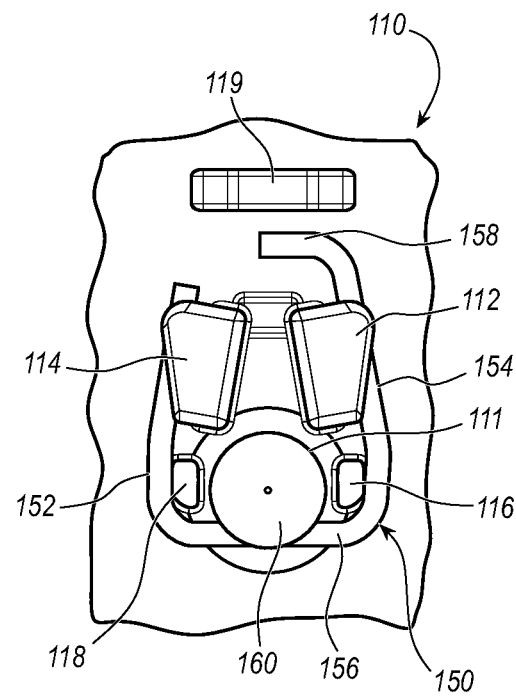
FIG. 3B depicts the mounting interface and spring clip following engagement between the spring clip and a hooked prong.

FIGS. 3A and 3B depict close-up views of a mounting interface 110 with spring clip 150 positioned therein. As shown in these figures, spring clip 150 may, in some embodiments, comprise four legs or sides extending about an open center region. As discussed further below, a coupling prong 160 or other protruding coupling member may be inserted within this center region during assembly to lock the spring clip 150 in place.

Spring clip 150 comprises a first leg/side 152 that extends opposite a second leg/side 154. In the depicted embodiment, each of these legs/sides comprises a first portion that extends parallel to the corresponding opposite leg/side and then angels towards one another at an acute angle β, which may be between about 20 and about 40 degrees in some embodiments. In more preferred embodiments, angle β, may be between about 20 and about 40 degrees It can also be seen that, in preferred embodiments including the depicted embodiment, opposing legs 152/154 are symmetrical, both with respect to a central axis of spring clip 150 and about a central axis of mounting interface 110. It can also be seen that spring clip 150 is preferably formed such that each of the various sides extends parallel to one another in the same plane but, as described herein and depicted in the accompanying figures, may be angled towards one another within this plane.

Opposing sides/legs 152 and 154 are connected along a third side/leg 156, which may extend perpendicular, or at least substantially perpendicular, to sides/legs 152 and/or 154. Opposite side/leg 156, a partial side/leg 158 may be provided, which, as discussed below, may provide for an interface with a tool that may be used to release spring clip 150 and thereby release an airbag module from a steering wheel or another mounting surface/element of a vehicle. Thus, in the depicted embodiment, spring 150 defines a trapezoid in shape. In addition, the tool interface region is outside of the aforementioned open/central region within which the prong 160 extends to lock the spring clip 150 in place.

The mounting interface 110 comprises an opening 111 and one or more surrounding guiding/mounting features for guiding spring 150 and/or locking spring 150 into place. In particular, as shown in FIG. 3B, a first mounting structure 112 is provided on one side of interface 110 and a second mounting structure 114 is provided on the opposite side. Thus, mounting structure 112 is configured to engage the angled leg 154 of spring 150 and, similarly, mounting structure 114 is configured to engage the angled portion of leg 152 of spring 150. One or both of these mounting structures 112/114 may comprise various features/surfaces to facilitate desired flexing/movement of spring 150 during assembly and/or disassembly. For example, as discussed in greater detail below, an angled surface may be provided that may engage an angled surface of one of the sides of spring 150 to inhibit rotation of that side while the opposite side has a point contact to facilitate rotation of just one side of spring 150 during installation. Similarly, one or both of mounting structures 112/114 may comprise an overhang defining an underlying recessed region to allow spring 150 to flex over the overhang and seat within the recess defined thereunder to secure spring 150 in place and prevent unintentional disassembly.

Figure 5A:
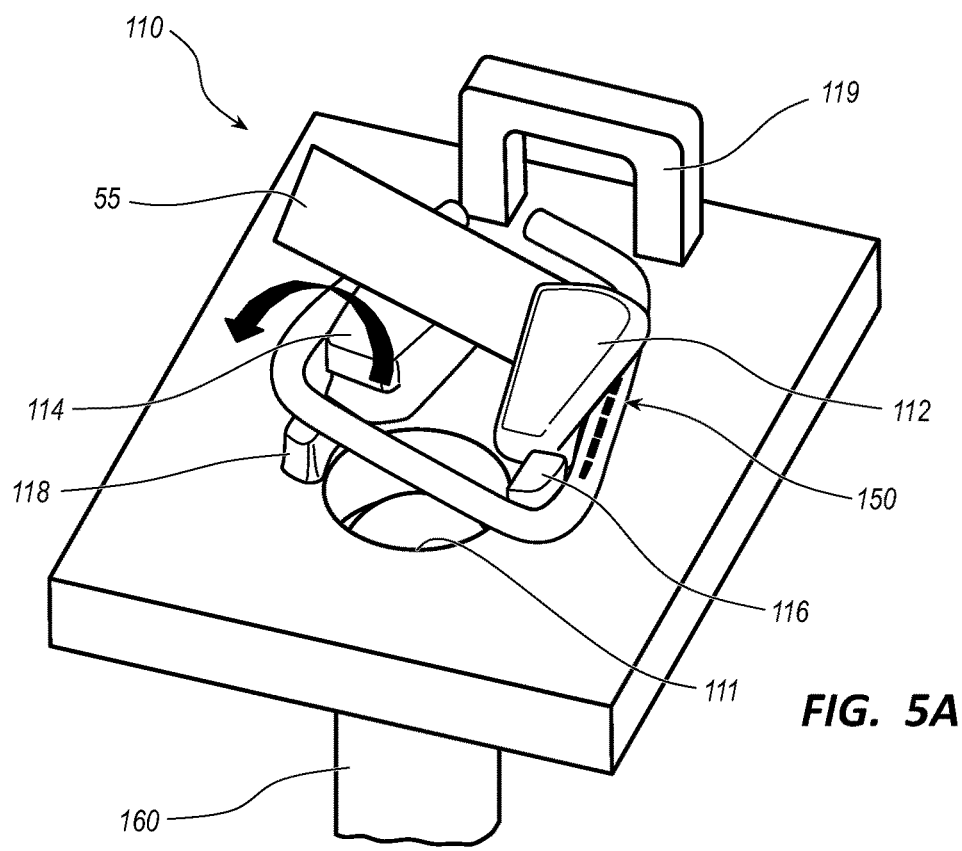
FIGS. 5A and 5B depict steps in a method for coupling a spring clip to a mounting interface.
Figure 5B:
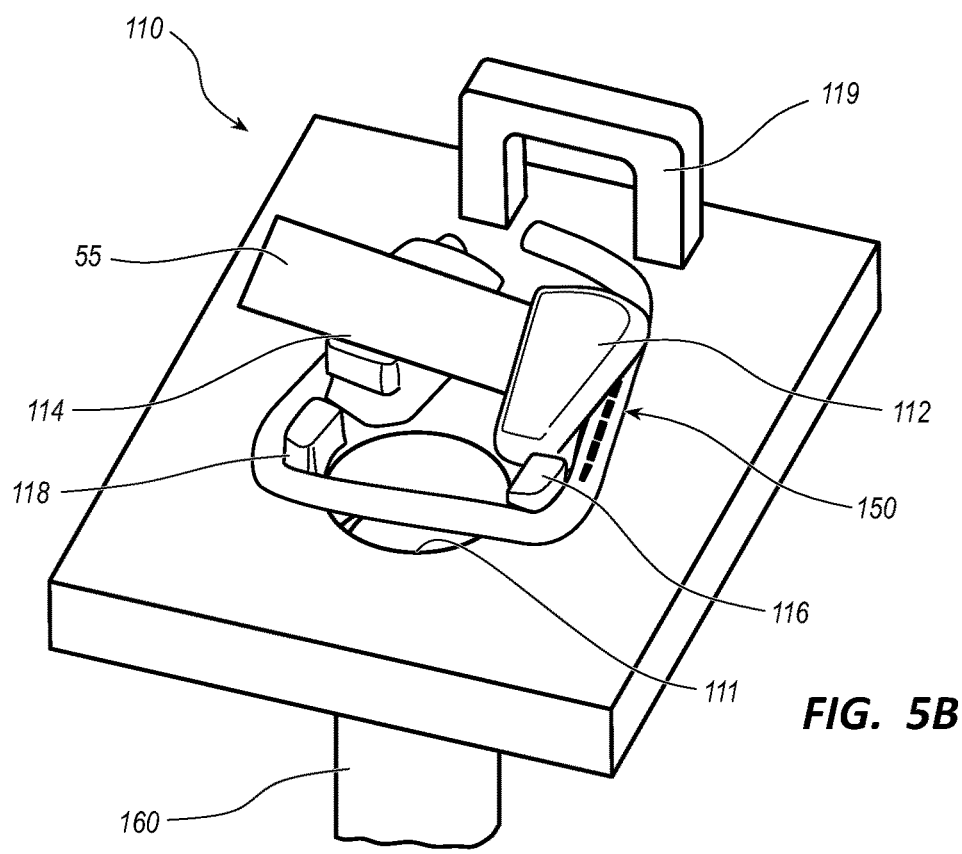

Other guiding features may also be provided if desired. For example, in the depicted embodiment, guiding/mounting structures 116 and 118 are provided opposite one another on opposing sides of opening 111. Structures 116 may keep spring 150 in position and guide it back and forth during various stages of installation/assembly, as discussed throughout this disclosure. As shown in FIG. 3B, once spring 150 is in place using one or more of the aforementioned guiding/mounting structures, a coupling prong 160, which may extend from and be a part of either airbag module 102 or steering wheel 104, may be extended through opening 111 to secure the airbag module 102 to the steering wheel 104 or, in other embodiments, to secure an airbag module to another suitable location within a vehicle. An adjacent structure 119 may also be provided if desired, which may be used to guide a tool for uninstalling airbag module 102 and/or may be used to confine spring 150, such as to prevent spring 150 from translating too far in the absence of the presence of prong 160. As shown in FIGS. 5A and 5B, structure 119 may, in some embodiments, comprise a central opening to allow a tool to extend therethrough. The walls defining the opening may be used to engage spring 150 during use to, again, inhibit undue translation of spring 150 during installation.

Figure 4A:
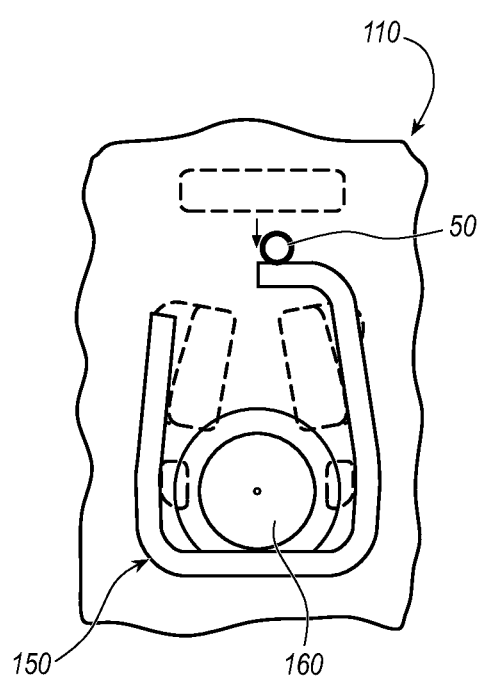
FIGS. 4A and 4B depict a tool being used to disengage the spring clip from the hooked prong to allow for disassembly of an airbag module with a steering wheel or other vehicle structure.
Figure 4B:
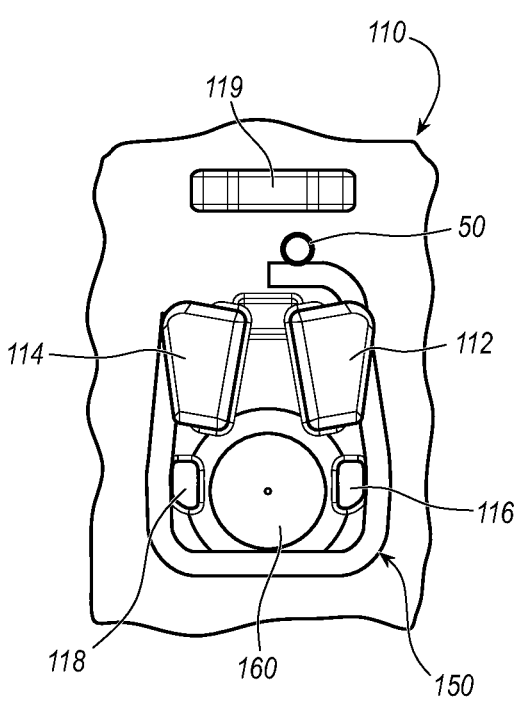

FIGS. 4A and 4B illustrate possible steps for uninstallation of airbag module 102 from steering wheel 104. In particular, a tool 50 may be used to contact leg 158 and to apply a force (downward from the perspective of these figures, as indicated by the arrow in FIG. 4A) to allow spring 150 to translate away from prong 160 to allow prong 160 to be removed.

FIGS. 5A and 5B illustrate steps involved in coupling of spring 150 to interface 110. As shown in FIG. 5A, spring 150 may initially be positioned about one side of interface 110, namely, mounting structure 112. Spring 150 may then be rotated so that the leg opposite the leg contacting mounting structure 112 rotates about the opposite mounting structure 114, as indicated by the arrow in FIG. 5A. As indicated by the dashed line in FIG. 5A, preferably, linear contact is maintained between spring 150 on this side and mounting structure 112 so as provide a pivoting surface to inhibit rotation of a first side of the spring 150 as a second side of the spring 150 opposite the first side rotates. Thus, coupling of spring 150 to interface 110 involves both a translational and a rotational movement. Optionally, a tool 55 may be used to facilitate this coupling procedure.

Figure 6A:
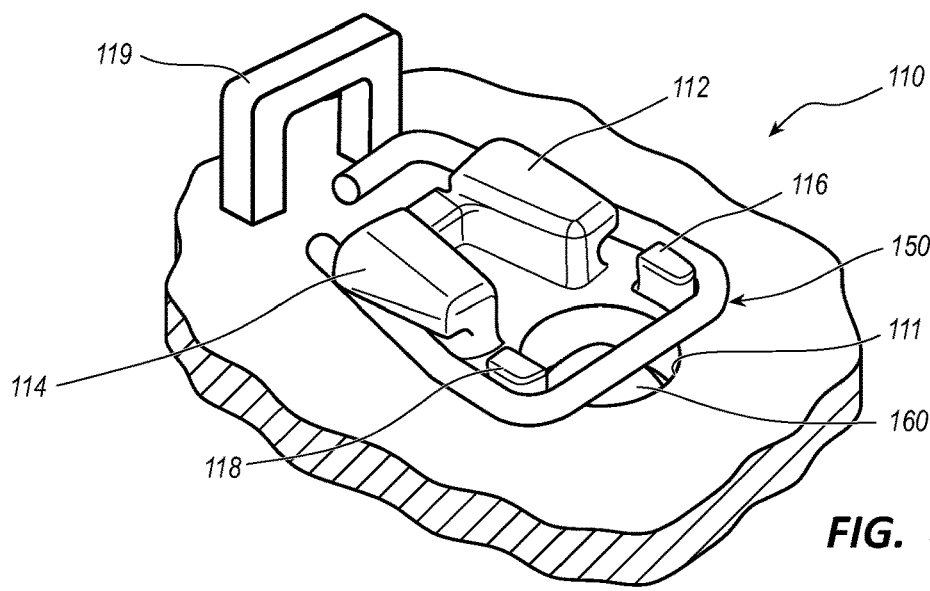
FIGS. 6A-6C depict steps in a method for coupling a hooked prong to a spring clip seated within a mounting interface.
Figure 6B:
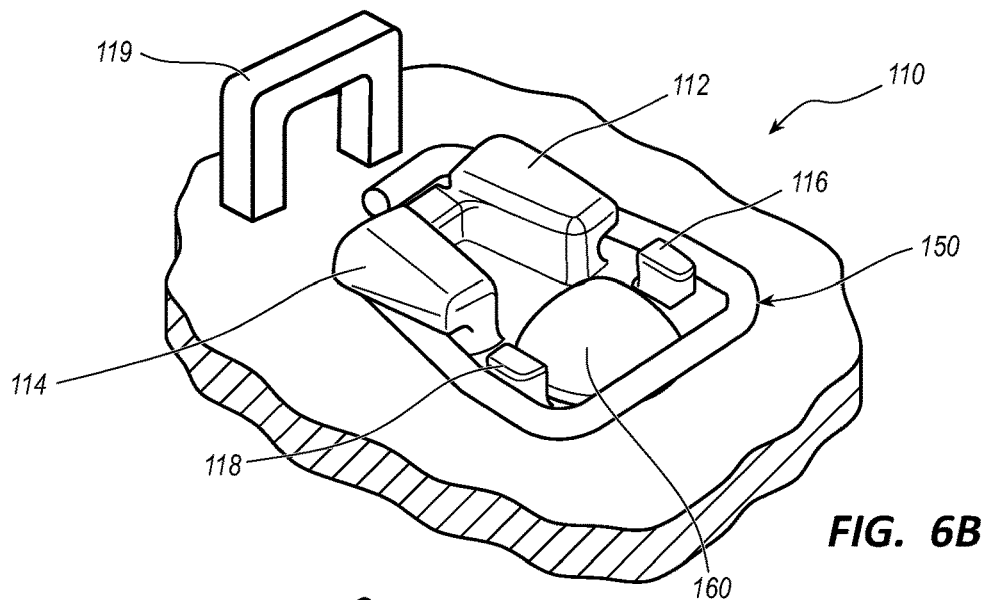
Figure 6C:
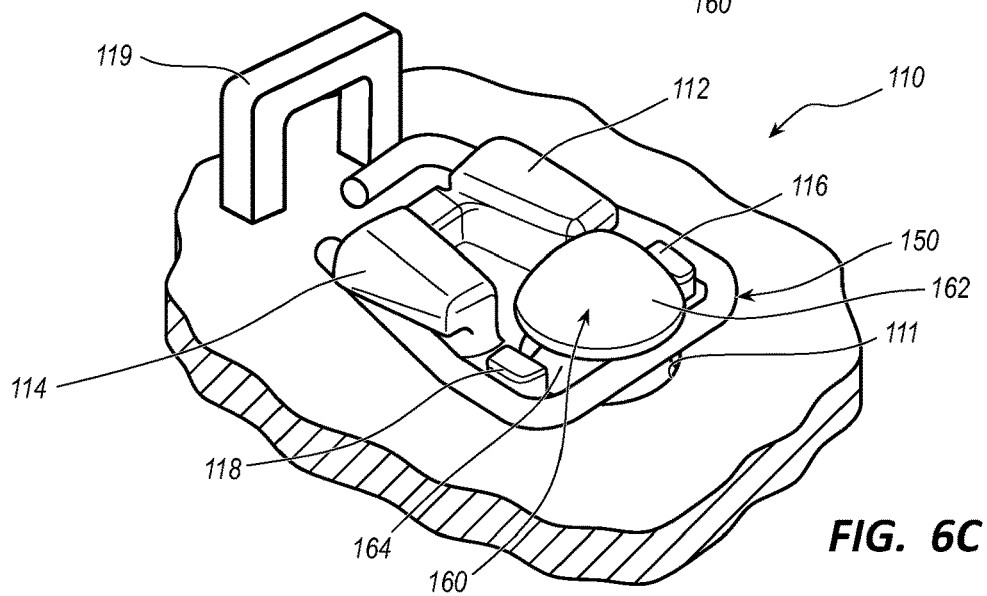

Once the spring clip 150 is in place, properly confined by the various mounting/guiding structures of interface 110, prongs 160 may be extended through openings 111 to secure the mounting of, for example, airbag module 102 to steering wheel 104. These steps are illustrated in FIGS. 6A-6C. It should be understood, that, as described elsewhere herein, interface 110 is configured to lock spring clip 150 in place and to, as shown in FIGS. 6A-6C, only allow for a translation of the spring clip 150 to accommodate a pin/prong 160 to lock two structures in place, such as an airbag module to a steering wheel.

FIG. 6A depicts the initial stage of this process in which spring clip 150 is positioned and confined about structures 112-18. As also shown in this figure, spring clip 150 partially extends over opening 111, which allows prong 160, during entry therethrough, to automatically reposition spring clip 150 to accommodate prong 160 and then, as discussed below, automatically slide back into place to lock prong 160 therein.

As best seen in FIG. 6C, in some embodiments, prong 160 may comprise a ramped tip 162 configured to translate the spring clip 150 during assembly. Similarly, prong 160 may further comprise a recessed and/or hooked portion 164 adjacent to the ramped tip 162. Hooked portion 164 may be configured to receive a portion of the spring clip 150 after the ramped tip 162 has extended past the spring clip 150 during assembly to allow the spring clip 150 to translate back towards its initial configuration and lock into place.

In particular, FIG. 6B depicts the aforementioned engagement of the ramped tip 162 of prong 160 with spring clip 150 as prong 160 is advanced through opening 111. Due to the overlap of spring clip 150 with opening 111 and the ramped tip 162 of prong 160, advancement of prong 160 therethrough results in a translation of spring clip 150 towards the bottom of mounting interface 110, as shown in FIG. 6B. Once prong 160 has been advanced to the point where spring clip 150 is able to seat within the adjacent recess/hooked portion 164 of prong 160, spring clip 150 then translates back in the opposite direction to allow prong 160 to lock spring clip 150 in place. Because of the angled portions of spring clip 150 and their engagement with the various guiding/mounting elements of interface 110, the translation of spring clip 150 in the downward direction results in a force/bias in the opposite direction so that, as soon as spring clip 150 has advanced past the surface of ramped tip 162, this translation/movement in the opposite direction takes place automatically, and results in the final configuration depicted in FIG. 6C in which prong 160 is locked into place, thereby locking airbag module 102 into place vis-à-vis steering wheel 104. Of course, although only one spring clip 150, one prong 160, and one corresponding mounting interface 110 is shown in FIGS. 6A-6C, it should be understood that multiple similar or identical spring clips, prongs, and mounting interfaces may be provided, each of which may be coupled simultaneously to provide this coupling/mounting.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A coupling assembly for coupling a driver airbag module to a steering wheel, the coupling assembly comprising:
    a spring defining a perimeter comprising at least three sides, wherein a first side of the at least three sides extends opposite a second side of the at least three sides, wherein the first side is at least partially angled towards the second side at an acute angle, and wherein the first and second sides of the spring are connected along a third side of the at least three sides of the spring;
    a spring mounting structure providing a guiding interface for coupling the spring to the steering wheel; and
    an opening configured to receive a coupling prong, wherein the coupling prong is configured to engage the third side of the spring.

2. The coupling assembly of claim 1, wherein the spring mounting structure comprises a linear interface surface configured to engage the first side of the spring to inhibit rotation of the first side of the spring as the second side of the spring rotates during assembly.

3. The coupling assembly of claim 1, wherein the third side extends from the first and second sides of the spring at an at least substantially perpendicular angle.

4. The coupling assembly of claim 3, wherein the first and second sides of the spring each comprises:
    a straight portion extending from the third side at the at least substantially perpendicular angle; and
    an angled portion extending from the straight portion, wherein the angled portions of the first and second sides are angled towards one another.

5. The coupling assembly of claim 3, wherein the spring further comprises a fourth side opposite the third side, wherein the fourth side is at least substantially parallel to the third side, wherein the spring at least substantially comprises a trapezoid in shape, and wherein the first side is symmetrical with the second side about an axis of the spring extending between the third side and the fourth side.

6. The coupling assembly of claim 1, further comprising a plurality of springs and a plurality of corresponding spring mounting structures.

7. The coupling assembly of claim 1, wherein the acute angle is between about 20 and about 40 degrees.

\* \* \* \* \*